(12) United States Patent
Murayama et al.

(10) Patent No.: US 8,177,044 B2
(45) Date of Patent: May 15, 2012

(54) AUTOMOTIVE IMPACT ABSORBING MEMBER

(75) Inventors: Masaru Murayama, Komaki (JP); Junichiro Suzuki, Komaki (JP)

(73) Assignee: Tokai Rubber Industries, Ltd., Komaki-Shi (JP)

( * ) Notice: Subject to any disclaimer, the term of this patent is extended or adjusted under 35 U.S.C. 154(b) by 1204 days.

(21) Appl. No.: 11/984,986

(22) Filed: Nov. 26, 2007

(65) Prior Publication Data
US 2008/0122147 A1     May 29, 2008

(30) Foreign Application Priority Data
Nov. 29, 2006 (JP) ................................. 2006-322129

(51) Int. Cl.
*F16F 16/12* (2006.01)
*B60R 19/03* (2006.01)

(52) U.S. Cl. .................... 188/377; 188/371; 296/187.05; 293/122

(58) Field of Classification Search .......... 188/371–377; 267/6, 140, 153; 293/120, 133, 122; 296/187.05
See application file for complete search history.

(56) References Cited

U.S. PATENT DOCUMENTS

| | | | | |
|---|---|---|---|---|
| 3,869,167 A * | 3/1975 | Muller | ........................ | 293/110 |
| 3,997,207 A * | 12/1976 | Norlin | ........................ | 293/110 |
| 4,186,915 A * | 2/1980 | Zeller et al. | ........................ | 267/140 |
| 5,806,889 A * | 9/1998 | Suzuki et al. | ........................ | 280/748 |
| 5,826,907 A * | 10/1998 | Saito et al. | ........................ | 280/808 |
| 5,857,702 A * | 1/1999 | Suga et al. | ........................ | 280/751 |
| 6,000,738 A * | 12/1999 | Stewart et al. | ........................ | 293/102 |
| 6,003,912 A * | 12/1999 | Schonhoff et al. | ........................ | 293/122 |
| 6,209,934 B1 * | 4/2001 | Sakuma et al. | ........................ | 293/120 |
| 6,258,465 B1 * | 7/2001 | Oka et al. | ........................ | 428/599 |
| 6,481,690 B2 * | 11/2002 | Kariatsumari et al. | ........................ | 293/155 |
| 6,502,874 B2 * | 1/2003 | Kajiwara et al. | ........................ | 293/133 |
| 6,962,379 B2 * | 11/2005 | Minami et al. | ........................ | 293/120 |
| 7,000,975 B2 * | 2/2006 | Haneda et al. | ........................ | 296/132 |
| 7,354,030 B2 * | 4/2008 | Murayama et al. | ........................ | 267/140 |
| 7,575,391 B2 * | 8/2009 | Tarazona de La Asuncion | | 404/6 |
| 2002/0149214 A1 | 10/2002 | Evans | | |
| 2004/0084910 A1 * | 5/2004 | Amano et al. | ........................ | 293/102 |
| 2007/0085252 A1 | 4/2007 | Murayama et al. | | |

FOREIGN PATENT DOCUMENTS

| | | |
|---|---|---|
| JP | A 06-171441 | 6/1994 |
| JP | A 2006-062635 | 3/2006 |

* cited by examiner

*Primary Examiner* — Bradley King
*Assistant Examiner* — Thomas Irvin
(74) *Attorney, Agent, or Firm* — Oliff & Berridge, PLC

(57) ABSTRACT

An automotive impact absorbing member integrally formed of synthetic resin material having lengthwise shape that extends with a constant hollow cross section. The impact absorbing member includes: plate-shaped rib portions each extending in a direction perpendicular to an impact load input direction; and load transmitting portions connecting with rib portions at either widthwise end thereof for transmitting a widthwise direction component force of the impact load to the rib portions. At least one of the plate-shaped rib portions has a thin portion of minimum thickness dimension situated in a widthwise center section thereof, and has a pair of gradual change portions situated to either side of the thin portion in a width direction and which increase gradually in thickness dimension outwardly in the width direction.

9 Claims, 6 Drawing Sheets

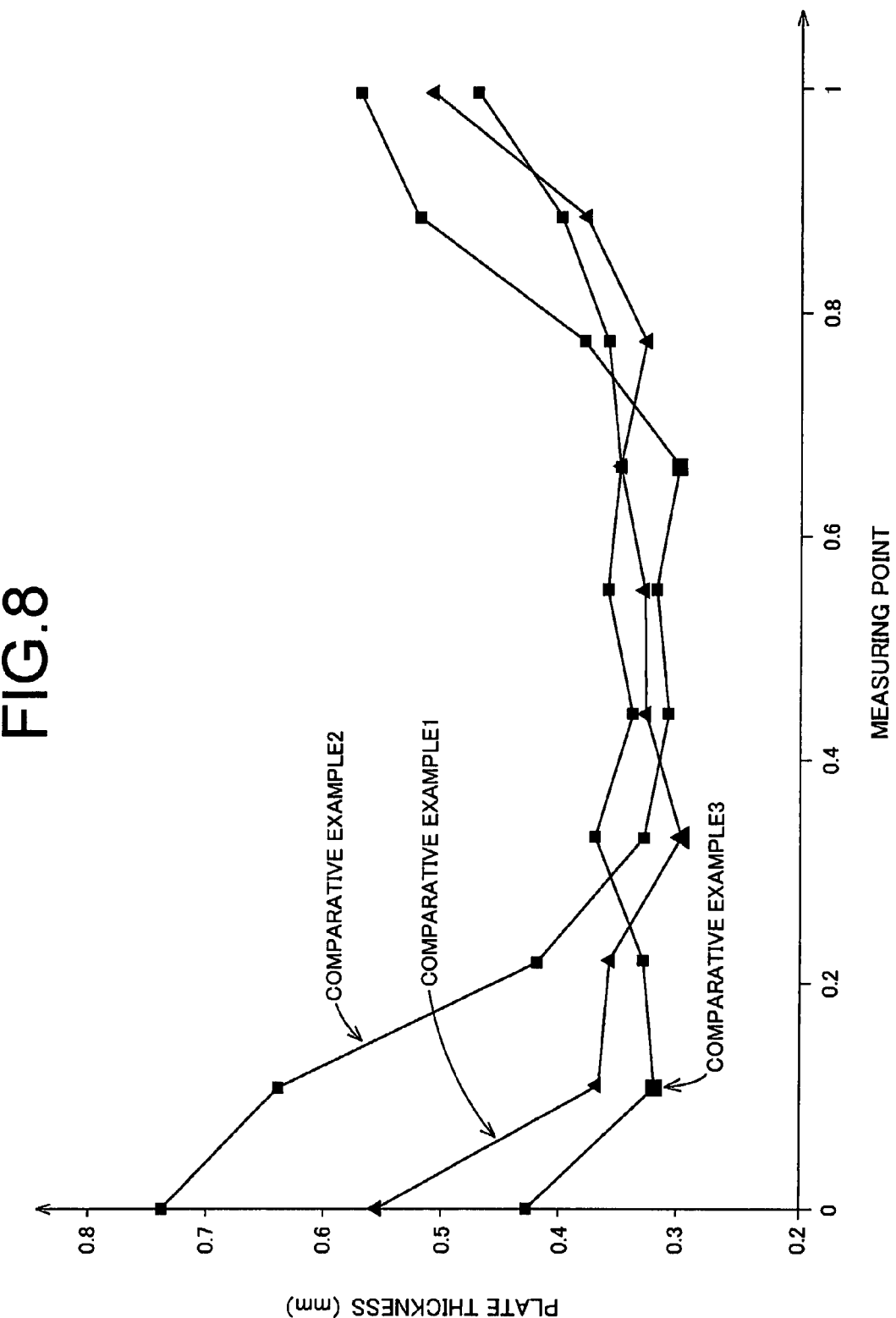

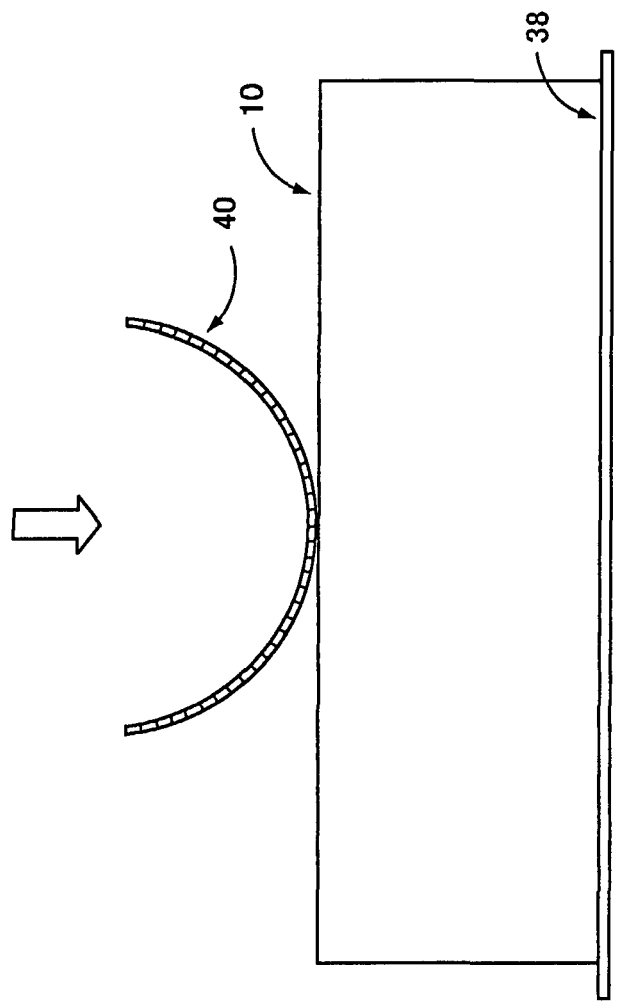
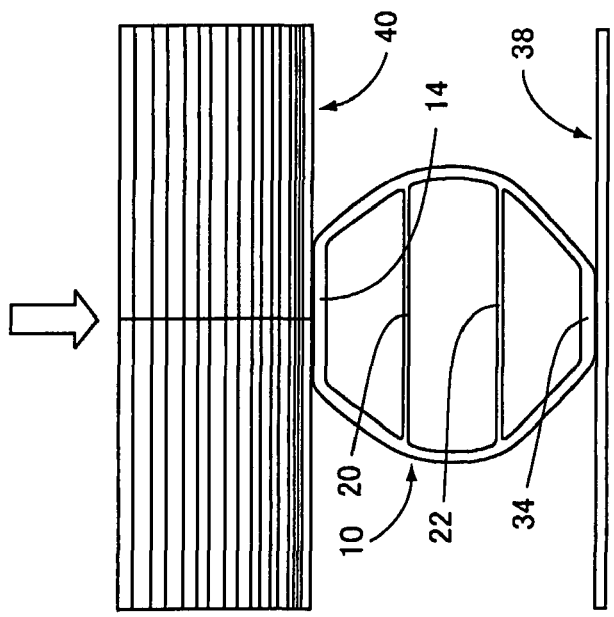

AUTOMOTIVE IMPACT ABSORBING MEMBER

INCORPORATED BY REFERENCE

The disclosure of Japanese Patent Application No. 2006-322129 filed on Nov. 29, 2006 including the specification, drawings and abstract is incorporated herein by reference in its entirety.

BACKGROUND OF THE INVENTION

1. Field of the Invention

The present invention relates to an automotive impact absorbing member for absorbing impact force and protecting passengers in the event of a car crash.

2. Description of the Related Art

Automotive impact absorbing members which are capable of absorbing a jarring load in the event of a car crash have been employed for some time in automobile bumpers or the members which form the cabin, for example. Once such type of impact absorbing member has a structure furnished with a plate-shaped rib portion that extends in the direction perpendicular to the direction of input of impact load; and load transmitting portions connecting with the rib portion at either widthwise end thereof for transmitting the widthwise direction component force component of the impact load to the rib portion. Such designs are taught, for example, in Patent Document 1 (JP-A-06-171441) and Patent Document 2 (JP-A-2006-062635), and are constituted in such a way that the impact load will be input to the load transmitting portions, giving rise to tensile deformation of the rib portion in its widthwise direction, with the energy of impact being absorbed on the basis of energy loss resulting inter alia from ductility of the rib portion.

In the impact absorbing members of the conventional designs taught in the aforementioned Patent Documents 1 and 2, it has proven difficult to produce a rib portion of uniform thickness owing to variability in the precision of the molding process and other such production-related issues, and there exists a need for more advanced technology to achieve uniform thickness.

For this reason, it has proven difficult to predict the locations in the rib portion at which will form thin sections where localized strain (necking) is likely to occur in association with tensile stress due to the small cross sectional area. Particularly where such thin sections are produced at the ends of the rib portion, there is a risk that a problem such as the following will occur.

SUMMARY OF THE INVENTION

It is therefore one object of this invention to provide an automotive impact absorbing member of novel structure whose plate-shaped rib portion exhibits satisfactory properties such as tensile deformation and ductility, and which consistently affords the expected impact absorbing effect.

The above and/or optional objects of this invention may be attained according to at least one of the following modes of the invention. The following modes and/or elements employed in each mode of the invention may be adopted at any possible optional combinations. It is to be understood that the principle of the invention is not limited to these modes of the invention and combinations of the technical features, but may otherwise be recognized based on the teachings of the present invention disclosed in the entire specification and drawings or that may be recognized by those skilled in the art in the light of the present disclosure in its entirety.

A first aspect of the present invention provides an automotive impact absorbing member integrally formed of synthetic resin material having lengthwise shape that extends with a constant hollow cross section, the automotive impact absorbing member comprising: plate-shaped rib portions each extending in a direction perpendicular to an impact load input direction; and load transmitting portions connecting with rib portions at either widthwise end thereof for transmitting a widthwise direction component force of the impact load to the rib portions, wherein at least one of the plate-shaped rib portions has a thin portion of minimum thickness dimension situated in a widthwise center section thereof, and has a pair of gradual change portions situated to either side of the thin portion in a width direction and which increase gradually in thickness dimension outwardly in the width direction.

In the automotive impact absorbing member of structure according to the present invention, by situating a thin portion of minimum thickness dimension in the widthwise center section of the plate-shaped rib portion, necking will tend to occur in the center section of the plate-shaped rib portion. A sufficient necking deformation zone will be assured thereby, and impact energy absorbing effect will be achieved effectively through gradual extension of the zone of decreased cross sectional area to either side in the width direction.

Moreover, the pair of gradual change portions which increase gradually in thickness dimension outwardly in the width direction are provided at either side of the thin portion in the width direction, making it possible to avoid sudden change in cross sectional area when necking occurs towards either side in the widthwise direction from the thin portion in the widthwise center section. It is possible thereby to avoid a situation where, for example, a sudden rise in stress in the section of change in cross section occurs with the plate-shaped rib portion still in the initial state of tensile deformation, resulting in premature rupture.

It is therefore possible to achieve consistent tensile deformation of the plate-shaped rib portion in association with an input impact load. It is also possible to advantageously realize impact absorbing effect on the basis of energy loss through ductility or other deformation characteristics of the plate-shaped rib portion.

In the present invention, the widthwise center section of the plate-shaped rib portion refers to a section that includes the widthwise center and zones to either widthwise side of the center which respectively extend over 10% of the entire widthwise dimension, i.e., to the section of a zone extending over the center 20% of the entire widthwise dimension. Positioning of the thin portion in the widthwise center section of the plate-shaped rib portion refers to situating the thin portion at least in part in this center 20% zone section.

The automotive impact absorbing member according to the present invention will preferably employ a structure wherein the rate of change r (t/w) of the thickness dimension (t) relative to the width dimension (w) of the gradual change portions is $0 < r < 2$ as computed using the expression: $r = (((t_1 - t_0)/t_0) \times 100)/w$, where $t_0$ denotes the thickness dimension of the gradual change portion at the widthwise inner end thereof which connects with the widthwise outer end of the thin portion and which represents the minimum thickness dimension of the gradual change portion, and $t_1$ denotes the thickness dimension at the widthwise outer end which represents the maximum thickness dimension of the gradual change portion. Such a structure will afford additional improvement in impact absorbing effect on the basis of tensile deformation of the plate-shaped rib portion. However, if the rate of change of the gradual change portions exceeds 2, the rate of change of cross sectional area from the thin portion to the gradual change portions will increase to the point that, due to this sudden change in cross sectional area, energy absorption based on deformation of the gradual change portions can no longer be expected, posing a risk that the plate-shaped rib portion will rupture. On the other hand, if the rate of change of the gradual change portions is 0, i.e. the gradual change portions are substantially nonexistent, it is possible that, depending inter alia on molding conditions, necking may occur at the ends of the plate-shaped rib portion, as a result making it substantially impossible to control deformation of the plate-shaped rib portion.

The automotive impact absorbing member according to the present invention will preferably employ a structure wherein the thin portion is formed so as to extend with unchanging thickness dimension in the width direction of the plate-shaped rib portion. Such a structure will ensure that the zone of decreased cross sectional area of the thin portion is larger in the width direction.

The automotive impact absorbing member according to the present invention will preferably employ a structure wherein the thin portion and the gradual change portions connect smoothly with a curved surface shape, in the width direction of the plate-shaped rib portion. This will reduce notable stress concentrations in the connecting sections of the thin portion and the gradual change portions.

The automotive impact absorbing member according to the present invention may also employ a structure wherein the thin portion and the gradual change portions situated to either side thereof in the width direction are formed with surface shapes which are curving surfaces connected in the width direction of the plate-shaped rib portion. This will substantially eliminate the width dimension of the thin portion in the plate-shaped rib portion, making it possible to ensure greater width dimension of the gradual change portions.

The automotive impact absorbing member pertaining to the present invention may also employ a structure wherein a plurality of plate-shaped rib portions are disposed spaced apart from one another in the impact load input direction. Such a structure can reduce the image load bearing on each single plate-shaped rib portion and improve durability of the plate-shaped rib portions, and as a result more advantageously realize properties such as tensile deformation and ductility, and more consistently afford the expected impact absorbing ability.

The automotive impact absorbing member pertaining to the present invention will preferably employ a structure wherein the ratio of the widthwise dimension of the thin portion to the total widthwise dimension of the plate-shaped rib portion is between 0 and 0.8; and the widthwise dimension of the gradual change portions to the total widthwise dimension of the plate-shaped rib portion is between 0.1 and 0.5. Specifically, extensive research conducted by the inventors has shown that where the ratio of the widthwise dimension of the thin portion and the ratio of the widthwise dimension of the gradual change portions to the total widthwise dimension of the plate-shaped rib portion lie within the respective numerical ranges taught above, the expected impact absorbing ability may be achieved extremely effectively.

BRIEF DESCRIPTION OF THE DRAWINGS

The foregoing and/or other objects features and advantages of the invention will become more apparent from the following description of a preferred embodiment with reference to the accompanying drawings in which like reference numerals designate like elements and wherein:

FIG. 8 is a graph demonstrating thickness distribution of plate-shaped rib portions employed in impact absorbing members according to comparative examples, which have been measured in terms of impact absorbing effect; and FIGS. 9A and 9B are views showing a way of measuring impact absorbing effect of automotive impact absorbing members, wherein FIG. 9A is a front elevational view and FIG. 9B is a side elevational view.

DETAILED DESCRIPTION OF PREFERRED EMBODIMENTS

Figure 1:
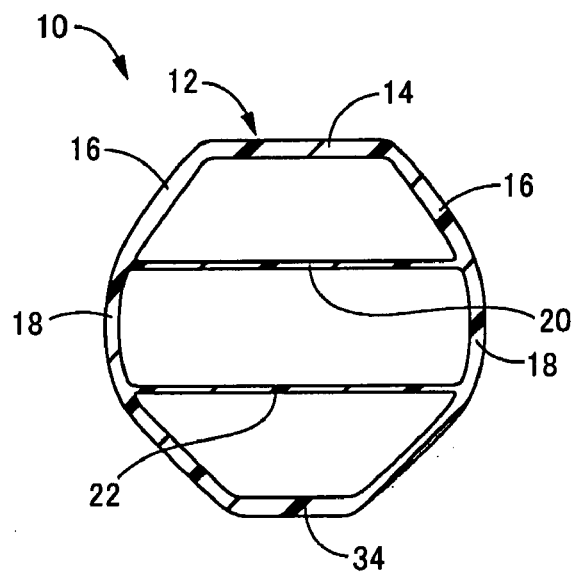
FIG. 1 is a transverse cross sectional view of an automotive impact absorbing member of construction according to one preferred form of the present invention.
Figure 2:
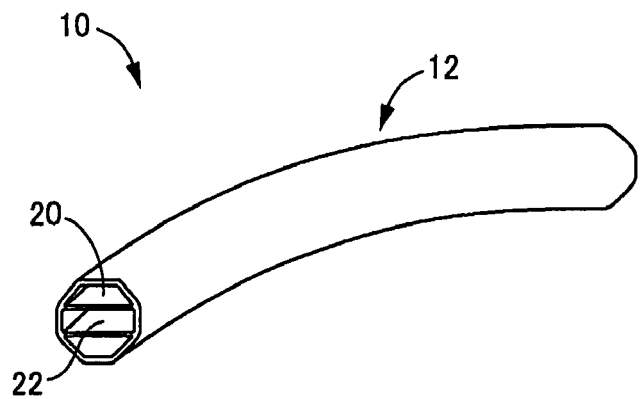
FIG. 2 is a perspective view of an entire of the automotive impact absorbing member of FIG. 1.

A more detailed understanding of the present invention will be provided through the following description of the preferred embodiments. First, FIGS. 1 and 2 depict an automotive impact absorbing member 10 according to a first embodiment of the present invention. The automotive impact absorbing member 10 has a tubular portion 12 of elongated shape; it is installed on a component targeted for impact absorption such as a car bumper or doorframe, and is designed to absorb impact through deformation of itself when impact load is input to the component targeted for impact absorption.

In greater detail, the tubular portion 12 has an elongated tubular shape that extends with substantially unchanging octagonal hollow cross section, and formed through extrusion molding or the like of a synthetic resin material. As the a synthetic resin material it would be possible to use, for example, nylon-6, polycarbonate, polybutylene terephthalate, polypropylene, polyethylene, ABS resin, or the like. It would be especially preferable to use resin material of polyester based resin fused with an elastomer.

Two planar portions which are positioned in opposition to either side of the center of the axis-perpendicular cross section of the tubular portion 12 along an axis lying in the axis-perpendicular direction (the vertical in FIG. 1), each of which portions has a flat planar shape extending in the width direction (sideways in FIG. 1). One of these two planer portions (the upper one in FIG. 1) constitutes a first load transmitting portion 14.

Two planar portions which connect with the widthwise sides of the first load transmitting portion 14 in the tubular portion 12 respectively constitute second load transmitting portions 16, 16. The second load transmitting portions 16 have generally flat planar shape extending outwardly in the width direction on the diagonal from the widthwise (sideways in FIG. 1) ends of the first load transmitting portion 14, towards one side in the thickness direction of the impact absorbing member 10. That is, the two connecting portions of the first load transmitting portion 14 with the second load transmitting portions 16 constitute two sides of octagonal tubular portion 12.

A pair of planar sections connecting with the widthwise outer ends of the second load transmitting portions 16 in the tubular portion 12 and positioned in opposition to either side of the center of the axis-perpendicular cross section of the tubular portion 12 along an axis lying in the axis-perpendicular direction (sideways in FIG. 1) respectively constitute third load transmitting portions 18, 18. The third load transmitting portions 18 have curving planar shape that bows outwardly in the width direction.

A first plate-shaped rib portion 20 and a second plate-shaped rib portion 22 are integrally provided on the inside of the tubular portion 12. The first plate-shaped rib portion 20 and the second plate-shaped rib portion 22 have generally flat planar shape which extends in the width direction; in the present embodiment in particular, they have substantially identical shape, size, and structure. The first plate-shaped rib portion 20 connects at its two widthwise ends respectively with the pair of ends on one side (the upper side in FIG. 1) of the third load transmitting portions 18 which connect with the second load transmitting portions 16 in the tubular portion 12, while the second plate-shaped rib portion 22 connects at its two widthwise ends respectively with the pair of ends on the other side (the lower side in FIG. 1) of the third load transmitting portions 18 in the tubular portion 12.

Specifically, the first plate-shaped rib portion 20 and the second plate-shaped rib portion 22 are integrally formed with the tubular portion 12 provided with the first to third load transmitting portions 14, 16, 18. With the width direction of the plate-shaped rib portions 20 22 (sideways in FIG. 1) extending generally parallel to the width direction of the first load transmitting portion 14, the first load transmitting portion 14, the first plate-shaped rib portion 20, and the second plate-shaped rib portion 22 are situated in opposition respective prescribed distances apart in the thickness direction (the vertical in FIG. 1) of the automotive impact absorbing member 10 perpendicular to the aforementioned width direction. The two widthwise ends of these plate-shaped rib portions 20, 22 also connect with the widthwise outer ends of the second load transmitting portions 16 and the third load transmitting portions 18 situated outwardly in the width direction from the two widthwise ends of the first load transmitting portion 14. Thus, the width dimensions of the plate-shaped rib portions 20, 22 are greater than the width dimension of the first load transmitting portion 14.

In short, the automotive impact absorbing member 10 is integrally formed of synthetic resin material and includes the tubular portion 12 having first to third load transmitting portions 14, 16, 18; the first plate-shaped rib portion 20; and the second plate-shaped rib portion 22. The automotive impact absorbing member 10 has an elongated shape which extends with substantially unchanging hollow cross section. In FIG. 1, the impact load input direction lies towards the first load transmitting portion 14 from above the first load transmitting portion 14. Consequently, the plate-shaped rib portions, which extend in the perpendicular direction to the impact load input direction, are constituted to include the first plate-shaped rib portion 20 and the second plate-shaped rib portion 22. Furthermore, the impact load transmitting portions, which connect with the two widthwise ends of the plate-shaped rib portions and transmit the widthwise direction component force component of the impact load to the plate-shaped rib portions, are constituted to include the first load transmitting portion 14, the second load transmitting portions 16, and the third load transmitting portions 18.

Figure 3:
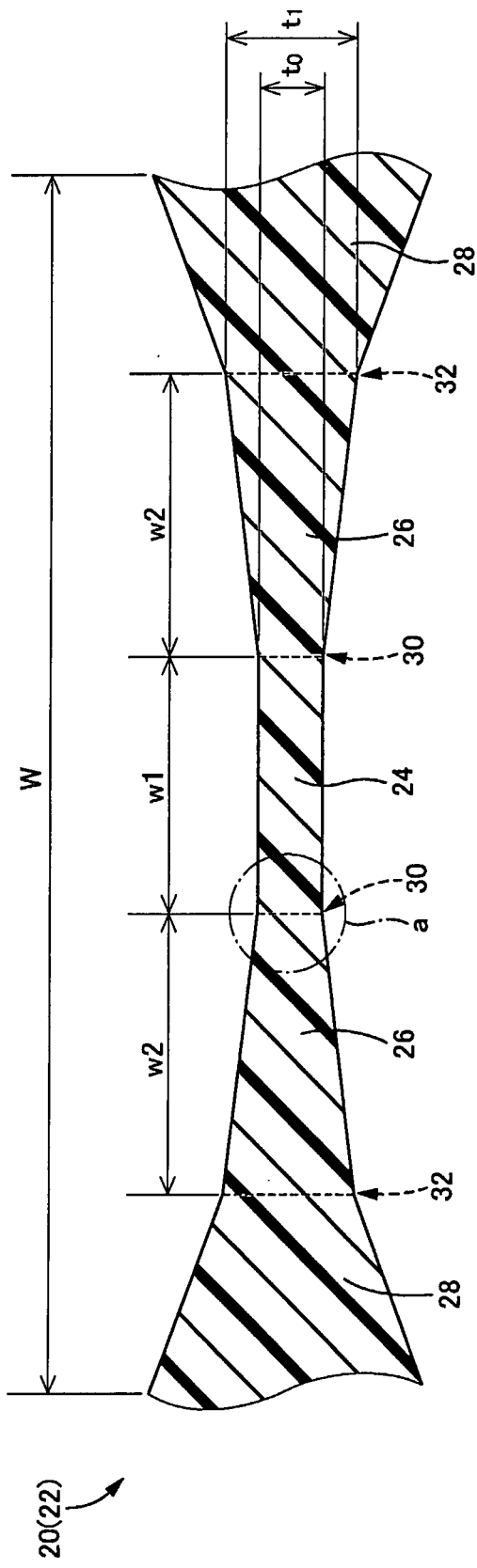
FIG. 3 is an enlarged fragmentary transverse cross sectional view of a plate-shaped rib portion of the automotive impact absorbing member of FIG. 1.

As depicted in model form in FIG. 3, the first and second plate-shaped rib portions 20, 22 are constituted to include a thin portion 24, gradual change portions 26, and thick portions 28.

The thin portion 24 has a generally flat shape which extends with a generally unchanging thickness dimension: $t_0$ through its entirety. This thickness dimension: $t_0$ represents the minimum thickness dimension in the entire first plate-shaped rib portion 20. The center of the thin portion 24 in the width direction (sideways in FIG. 3) is situated at the center of the first plate-shaped rib portion 20 in the width direction, with the thin portion 24 extending by prescribed distances generally identical in length to either side from this center in the width direction. As a result, the thin portion 24 of minimum thickness and prescribed width dimension: w1 is situated in the widthwise center section of the first plate-shaped rib portion 20. The ratio w1/W of the width dimension w1 of the thin portion 24 to the total width dimension: W of the plate-shaped rib portion 20 (22) is preferably between 0 and 0.8, more preferably between 0.1 and 0.4. The pair of gradual change portions 26, 26 are disposed at either widthwise end of this thin portion 24.

The gradual change portions 26 have generally flat shape overall, and connect at their widthwise inner end with the widthwise outer ends of the thin portion 24. In the present embodiment in particular, the thickness dimension at the widthwise inner end of the gradual change portions 26 is the same as the thickness dimension: $t_0$ of the thin portion 24, with the thickness dimension of the gradual change portions 26 increasing gradually towards the outside from the widthwise inner end to reach a maximum thickness dimension: $t_1$ at the widthwise outer end. The difference between the minimum thickness dimension ($t_0$) at the widthwise inner end of the gradual change portion 26 and the maximum thickness dimension: $t_1$ at the widthwise outer end may be modified in design appropriately depending on the required deformation characteristics, manufacturability, and so on, and is not limited in any particular way. The ratio: w2/W of the width dimension: w2 of the gradual change portion 26 to the total width dimension: W of the plate-shaped rib portion 20 (22) is preferably between 0.1 and 0.5, more preferably between 0.2 and 0.4. The thick portions 28 are respectively situated to the outside of the gradual change portions 26 in the width direction.

The thick portions 28 have generally flat shape overall, and connect at their widthwise inner end with the end of maximum thickness dimension: $t_1$ at the widthwise outer end of the gradual change portions 26. In the present embodiment in particular, the thickness dimension at the widthwise inner end of the thick portions 28 is the same as the maximum thickness dimension: $t_1$ of the gradual change portions 26, with the thickness dimension of the thick portions 28 increasing gradually towards the outside from the widthwise inner end. The rate of change (t/w) of the thickness dimension: t with respect to the width dimension: w of the thick portions 28 is greater than the rate of change (t/w2) of the thickness dimension: t with respect to the width dimension: w2 of the gradual change portions 26.

The widthwise ends of the first plate-shaped rib portion 20 and the widthwise ends of the second plate-shaped rib portion 22 are composed of the widthwise outer ends of the respective thick portions 28, and these outer ends of these thick portions 28 are integrally formed and thereby connected with the third load transmitting portions 18 at the first end and other end thereof in the tubular portion 12, as discussed previously.

In the present embodiment, the connecting sections 30 of the thin portion 24 with the gradual change portions 26 and the connecting sections 32 of the gradual change portions 26 with the thick portions 28 are respectively connected by slightly curved surface shapes in the width direction of the plate-shaped rib portions 20, 22.

In the present embodiment in particular, in preferred practice the rate of change (t/w2=r) of the thickness dimension: t to the width dimension: w2 of the gradual change portions 26 will be 0<r<2, more preferably 1<r<1.5.

The rate of change: r of the gradual change portions 26 is derived using Expression 1: $r=(t_1-t_0)/w2$; however, in actual molded articles, the difference between the maximum thickness dimension: $t_1$ and the minimum thickness dimension: $t_0$ will be very small, and in many instances the rate of change: r will vary easily depending on the material of the first plate-shaped rib portion 20 and other factors. Consequently, it is considered difficult to derive the rate of change: r with high accuracy simply using Expression 1, which merely represents a relationship among $t_0$, t1, and w2.

Figure 4:
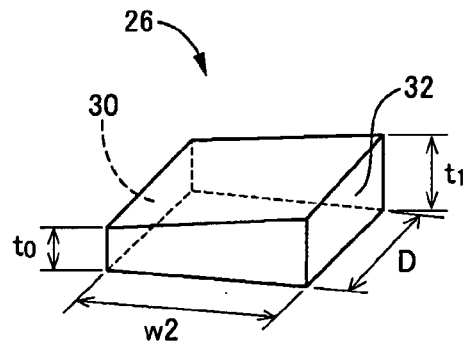
FIG. 4 is an enlarged schematic view of a gradual change portion of the plate-shaped rib portion of FIG. 3.

Accordingly, in preferred practice, Expression 2: $r=(((t_1-t_0)/t_0)\times 100)/w2$ will be employed to derive the rate of change: r of the gradual change portions 26 pertaining to the present embodiment. One reason behind employing Expression 2 rather than Expression 1 given earlier is to take into consideration rupture stress and yield stress derived from the relationship between the depth dimension: D of the gradual change portion 26 and the cross sectional area thereof in the depthwise direction (direction orthogonal to the width direction), as illustrated in FIG. 4. In the present embodiment, the depth dimension: D of the gradual change portions 26 is unchanging over their entire length Specifically, in the gradual change portion 26, the connecting section 30 of the widthwise inner end of minimum thickness dimension: $t_0$ with the widthwise outer end of the thin portion 24 has the smallest cross sectional area, whereas the connecting section 32 of the widthwise outer end of maximum thickness dimension: $t_1$ with the widthwise inner end of the thick portion 28 has the largest cross sectional area; therefore, it is assumed that during tensile deformation of the plate-shaped rib portions 20, 22, a rupture load: Fb will be produced in the connecting section 30 of the smallest cross sectional area, while a yield load: Fy will be produced in the connecting section 32 of the largest cross sectional area. Specifically, $Fb=t_0 \cdot D \cdot \sigma b$, and $Fy=t_1 \cdot D \cdot \sigma y$. σb (tensile yield stress) and σy (tensile rupture stress) are respectively material constants, and represent physical property values derived through tensile testing as specified in ISO 527 or JIS K7162 for example.

Thus, if Fb≧Fy, rupture of the plate-shaped rib portions 20, 22 will not occur in the connecting section 30 of minimum thickness dimension, whereas if Fb≦Fy, rupture of the plate-shaped rib portions 20, 22 will occur in the connecting section 30 of minimum thickness dimension.

In the present embodiment, since the depth dimension: D of the gradual change portion 26 is unchanging, the relationship of rupture stress and yield stress will be determined by $t_0$ and $t_1$; however, as noted, Expression 1, which merely represents a relationship among $t_0$, t1, and w2, does not reflect rupture stress or yield stress produced in the width direction of the gradual change portion 26, and composed of the depth dimension: D and the cross sectional area in the depthwise direction.

Accordingly, through the use of Expression 2, which does take into consideration factors such as stress produced in the width direction of the gradual change portion 26 from the proportion of the difference: $t_1-t_0$ between maximum thickness dimension: $t_1$ and minimum thickness dimension: $t_0$ with respect to minimum thickness dimension: $t_0$ of the gradual change portion 26, it is assumed that the actual rate of change: r or a value very lose thereto may be obtained.

The automotive impact absorbing member 10 endowed with a structure like that discussed above could advantageously used in an automotive bumper of known type such as that disclosed in Patent Document 2 (JP-A-2006-062635) previously filed by the Applicant. By using an adhesive, bolts, or the like to secure a mounting plate portion 34 composed of a plate-shaped section which is situated in opposition to the first load transmitting portion 14 of the tubular portion 12 along one axis (the vertical in FIG. 1) in the axis-perpendicular direction, to the bumper beam described in Patent Document 2, the automotive impact absorbing member 10 would be installed on a bumper with the direction orthogonal to the width direction of the first load transmitting portion 14 coincident with the impact load input direction.

Once so installed, if the bumper should hit something, the main impact load will be input to the first load transmitting portion 14 of the tubular portion 12 of the automotive impact absorbing member 10, whereupon the tubular portion 12 will undergo compressive deformation in a direction such that the first load transmitting portion 14 moves closer to the mounting plate portion 34. In association with this compressive deformation, the pair of second load transmitting portions 16, 16 and the pair of third load transmitting portions 18, 18 will undergo deformation in a direction generally orthogonal to the compression direction, i.e. so that each pair of load transmitting portions 16, 18 move away from one another outwardly in the width direction of the impact absorbing member 10.

In association with outward deformation in the width direction by the second load transmitting portions 16 and the third load transmitting portions 18 respectively, the first plate-shaped rib portion 20 and the second plate-shaped rib portion 22 will experience tensile deformation in the width direction, whereby the intended impact absorbing effect will be obtained on the basis of ductility of the plate-shaped rib portions 20, 22 through this tensile deformation.

Since each of the plate-shaped rib portions 20, 22 is provided in its widthwise center section with a thin portion 24 having minimum thickness dimension, during tensile deformation of the plate-shaped rib portions 20, 22, the phenomenon of localized decrease in cross sectional area, known as necking, will tend to occur in the widthwise center section. In other words, the widthwise end sections etc. of the plate-shaped rib portions 20, 22 have a structure resistant to the occurrence of necking in the initial state of tensile deformation.

Thus, even if necking should occur in the plate-shaped rib portions 20, 22, a deformation zone wherein the zone of decreased cross sectional area spreads gradually to either side in the width direction will be sufficiently assured in the center sections of the plate-shaped rib portions 20, 22, thereby consistently affording ductility of the plate-shaped rib portions 20, 22 through tensile deformation, and advantageously improving the impact energy absorbing effect.

Moreover, since a pair of gradual change portions 26, 26 which have gradually increasing thickness dimension towards the outside in the width direction are provided at either widthwise side of the thin portion 24, sudden changes in cross sectional area will be avoided when necking spreads to either side in the width direction from the thin portion 24 in the center section. Thus, it is possible to prevent the phenomenon of premature rupture in the state of initial deformation of the automotive impact absorbing member 10, due to a sudden rise in stress in sections of changing cross sectional area in the plate-shaped rib portions 20, 22.

In the present embodiment in particular, the connecting sections 30 of the thin portion 24 with the gradual change portions 26, and the connecting sections 32 of the gradual change portions 26 with the thick portions 28 are respectively connected by gradually curving surface shapes in the width direction of the plate-shaped rib portions 20, 22. Accordingly, rupture stress can be exerted on the connecting sections 30 of the thin portion 24 with the gradual change portions 26 which have the smallest cross sectional area of the connecting sections, while yield stress can be exerted on the connecting sections 32 of the gradual change portions 26 with the thick portions 28 which have the largest cross sectional area. It is accordingly a simple matter to ascertain the rupture location, and to modify the design according to the desired impact absorbing effect.

In the present embodiment, the rate of change r of the thickness dimension: t to the width dimension: w2 of the gradual change portions 26 is $0 < r < 2$, thus inhibiting rupture of the plate-shaped rib portions 20, 22 while at the same time achieving ductility more effectively.

Furthermore, in the present embodiment, the ratio of the width dimension: w1 of the thin portion 24 to the total width dimension: W of the plate-shaped rib portions 20, 22 is set to 0.21, while the ratio of the width dimension: w of the gradual change portion 26 to the total width dimension: W of the plate-shaped rib portions 20, 22 is set to 0.23. By making these ratios approximately the same with one another, it is possible to avoid a situation where necking occurs with difficulty at the center of the plate-shaped rib portions 20, 22 due to the width dimension of the thin portion 24 being large relative to the width dimension of the gradual change portions 26, as well as to more effectively achieve impact absorbing effect on the basis of ductility.

While the present invention has been described in detail in its presently preferred embodiment, for illustrative purpose only, it is to be understood that the invention is by no means limited to the details of the illustrated embodiment, but may be otherwise embodied. It is also to be understood that the present invention may be embodied with various changes, modifications and improvements which may occur to those skilled in the art, without departing from the spirit and scope of the invention.

For instance, the shape, size, structure, and other aspects of the tubular portion 12, the plate-shaped rib portions 20, 22, the thin portion 24, the gradual change portions 26, and the thick portions 28 are not limited in any particular way. As a specific example, the width dimensions in the thin portion 24 to either side from the center of the plate-shaped rib portions 20, 22 may differ from one another; or the width dimension of the thin portion 24 may be set to zero.

The thickness dimension of the thick portions 28 may be unchanging across the entire width direction; or where the thick portions 28 are not an essential element, the gradual change portions 26 may connect directly at their widthwise outer end to the tubular portion 12.

Figure 5:
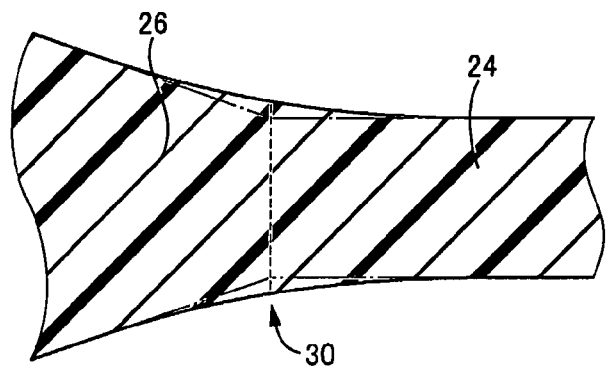
FIG. 5 is an enlarged fragmentary transverse cross sectional view of an automotive impact absorbing member of construction according to another preferred form of the present invention, which corresponds to an enlarged view of a portion "a" in FIG. 3.
Figure 6:
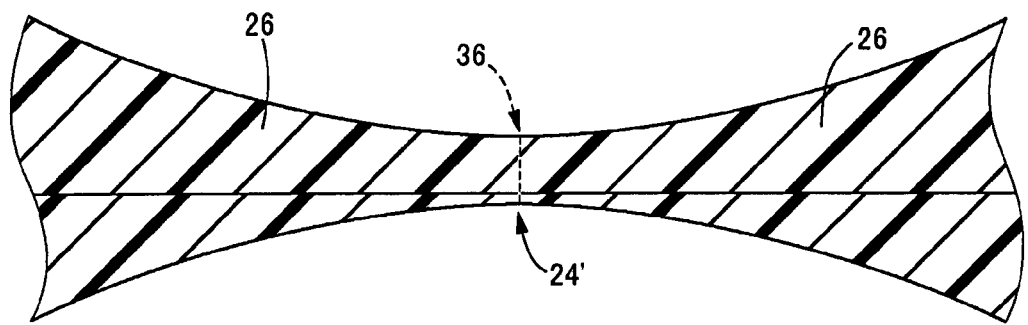
FIG. 6 is an enlarged fragmentary transverse cross sectional view of an automotive impact absorbing member of construction according to a further preferred form of the present invention.

In the embodiment described hereinabove, the connecting sections 30 of the thin portion 24 with the gradual change portions 26, and the connecting sections 32 of the gradual change portions 26 with the thick portions 28, are respectively connected by slightly curved surface shapes (see the dot-and-dash lines in FIG. 5). However, as shown in FIG. 5 in enlarged view corresponding to detail section a in FIG. 3, the connecting section 30 between the thin portion 24 and the gradual change portion 26 etc. may also connect smoothly with a bowed surface shape. In FIGS. 5 and 6, components and regions of substantially identical structure to those in the embodiment have been assigned the same symbols as in the embodiment and are not discussed in any detail.

Furthermore, in the embodiment described hereinabove, the thin portion 24 extends with a prescribed width dimension: w1 in the width direction of the plate-shaped rib portions 20, 22. However, it would be possible, for example, to instead provide the thin portion 24' with no width dimension as depicted in FIG. 6, and to establish the thin portion 24' at the connecting section 36 of the pair of gradual change portions 26, 26, as well as form the thin portion 24' and the pair of gradual change portions 26, 26 at either widthwise side thereof so as to have a surface shape composed of a bowed face connected with the plate-shaped rib portions 20, 22 in the width direction.

Furthermore, the number of plate-shaped rib portions is not limited to two as given herein by way of example; one, or three or more, may be employed instead. Where three or more plate-shaped rib portions are provided, the spacing among them may be the same or different.

In the embodiment described hereinabove, the pair of plate-shaped rib portions 20, 22 have mutually identical specifications, but could instead be different from each other.

Furthermore, the load transmitting portions need not be provided to the tubular portion 12 as in the example illustrated herein. It would be possible to instead employ impact load transmitting portions of slit tubular configuration provided with legs as shown in FIG. 6 of Patent Document 2 (JP-A-2006-062635).

Additionally, while the embodiment described hereinabove discussed by way of a specific example the use of the automotive impact absorbing member of the present invention for a bumper, the present invention would of course be applicable to other automotive components of which impact absorption is required.

EXAMPLES

Using the automotive impact absorbing member 10 shown in the embodiment hereinabove, tests were conducted to verify the impact absorbing effect of the present invention. The content and results of the tests are discussed below by way of working examples.

First, four automotive impact absorbing members of identical structure to the automotive impact absorbing member 10 according to the embodiment were prepared, and the thickness distribution of the first plate-shaped rib portion 20 of each automotive impact absorbing member was measured. Results are shown in FIG. 7, as Example 1, Example 2, Example 3, and Example 4.

Figure 7:
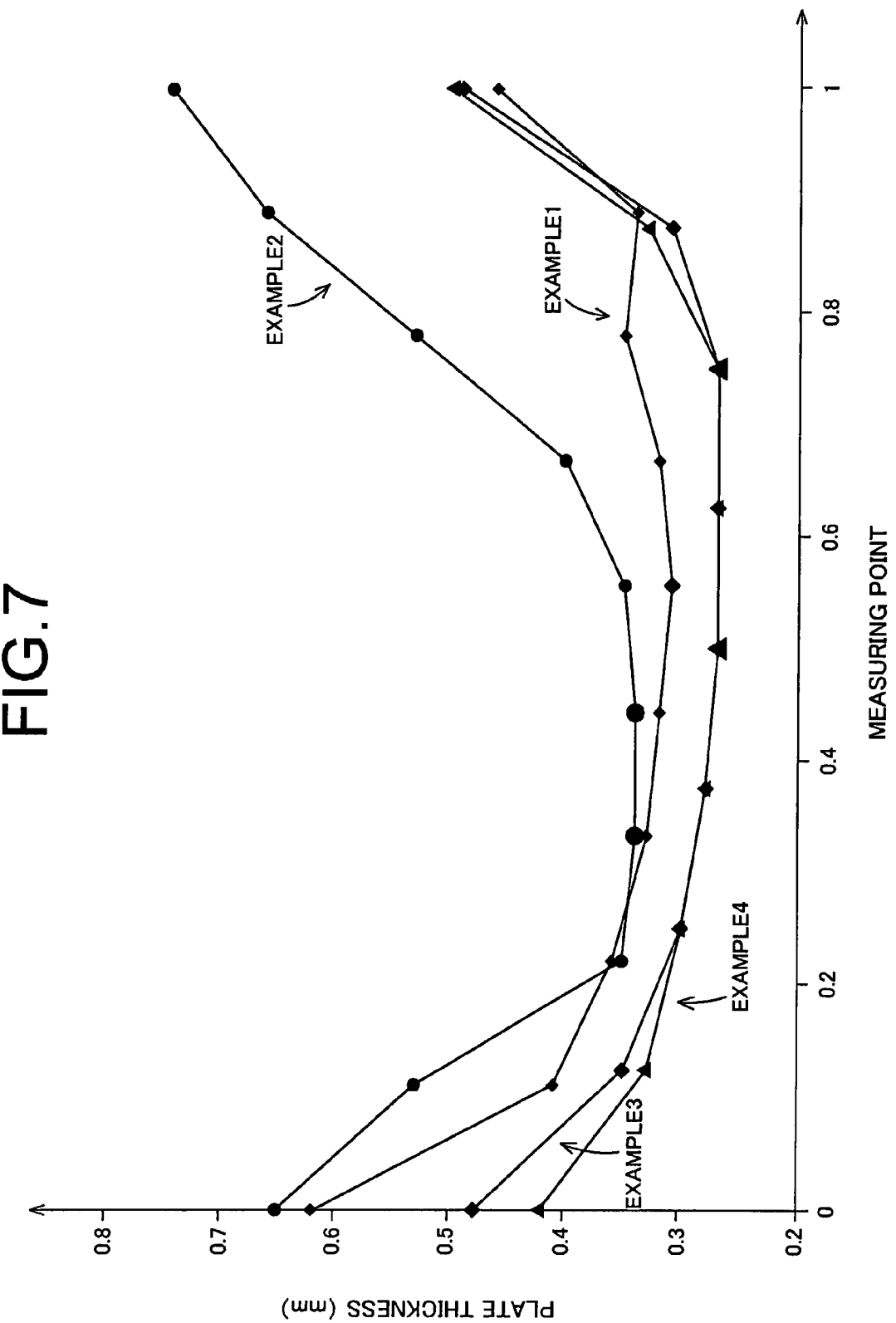
FIG. 7 is a graph demonstrating thickness distribution of plate-shaped rib portions employed in the automotive impact absorbing member according to the present embodiments, which have been measured in terms of impact absorbing effect.

Next, designating the location of minimum thickness dimension as the thinnest point location, the results of measuring the thickness dimension at the thinnest point location are shown in FIG. 7 and Table 1. The plate thickness measurement location is represented by assigning a value of 0 to a first widthwise end (the left end in FIG. 1) of the first plate-shaped rib portion 20 and a value of 1 to the other widthwise end (the right end in FIG. 1).

TABLE 1

|  | Rib rupture | Thinnest point location* | Gradual change portion rate of change | |
|---|---|---|---|---|
|  |  |  | mm thickness/ mm width | % thickness/ mm width |
| Example 1 | O | 0.55 | 0.001 | 0.333 |
| Example 2 | O | 0.22-0.44 | 0.001 | 0.333 |
| Example 3 | O | 0.5-0.75 | 0.004 | 1.333 |
| Example 4 | O | 0.5-0.75 | 0.006 | 2.000 |
| Compar. Ex. 1 | X | 0.33 | 0.006 | 2.00 |
| Compar. Ex. 2 | X | 0.66 | 0.008 | 2.67 |
| Compar. Ex. 3 | X | 0.11 | 0.011 | 3.67 |

*Location of plate thickness measurement when left end of rib is assigned 0 and right end assigned 1.
** Rate of change in thickness when based on thickness of thin portion Furthermore, the results of measuring the rate of change of the gradual change portions 26 of each working example using Expression 1: $r=(t_1-t_0)/w2$ are shown in the left column of the gradual change portion rate of change in Table 1 (unit: mm of thickness/mm of width), and the results of measurement using Expression 2: $r=(((t_1-t_0)/t_0)\times100)/w2$ are shown in the right column of the gradual change portion rate of change in Table 1 (unit: % of thickness/mm of width).

Additionally, using a production method similar to the conventional one, there were prepared three automotive impact absorbing members lacking a thin portion and gradual change portions in their plate-shaped rib portions and formed so as to have unchanging thickness dimension throughout the entire plate-shaped rib portion, but except for the plate-shaped rib portions otherwise having generally the same structure as the automotive impact absorbing member 10 of the working examples. The plate thickness distribution, thinnest point location, and gradual change portion rate of change of the plate-shaped rib portions of each of these automotive impact absorbing members were measured in the same manner as in the working examples. The results are shown in FIG. 8 and Table 1 as Comparative Example 1, Comparative Example 2, and Comparative Example 4. In the Comparative Examples, measurement of the gradual change portion rate of assumes that sections adjacent to the thinnest point location are gradual change portions.

From FIGS. 7 and 8 and Table 1, it will be apparent that the thinnest point locations corresponding to the thickness dimension: $t_0$ of the thin portion 24 in the working examples lie between measurement locations of 0.4 and 0.6 bordering a zone that extends through 20% of the center section in the width direction of the first plate-shaped rib portion 20. On the other hand, the thinnest point locations of the plate-shaped rib portions pertaining to the Comparative Examples were distributed in randomly and non-systematic fashion; in Comparative Examples 1 to 3 in particular, none lie between measurement locations of 0.4 and 0.6 bordering a zone that extends through 20% of the center section in the width direction of the first plate-shaped rib portion 20.

The gradual change portion rate of change measured using Expression 2 was $\leq2$ in the Examples, versus $\geq2$ in the Comparative Examples.

Next, impact resistance tests were carried out using the automotive impact absorbing members of Examples 1 to 4 and Comparative Examples 1 to 3 furnished with plate-shaped rib portions having plate thickness distribution such as discussed above. As shown in FIG. 9, in these tests, the mounting plate portion 34 of the automotive impact absorbing member 10 is secured superimposed onto a metal base 38. A tubular striker 40 having 70 mm diameter and 200 mm length is then dropped from above the first load transmitting portion 14 and caused to collide against the first load transmitting portion 14 in such a way that the lengthwise axis of the striker 40 and the lengthwise axis of the automotive impact absorbing member 10 are mutually orthogonal. In this way, a 3 m/s impact load will be exerted on the first load transmitting portion 14, inducing deformation of the first load transmitting portion 14 and the second load transmitting portions 16, and associated tensile deformation of the first plate-shaped rib portion 20. The results of the evaluation are presented in the "Rib rupture" column of Table 1, assigning a "O" to those in which the first plate-shaped rib portion 20 did not rupture, and a "X" to those in which it ruptured.

From the results shown in Table 1 it will be apparent that in the automotive impact absorbing members pertaining to Comparative Examples 1 to 3, the plate-shaped rib portions ruptured, whereas in the automotive impact absorbing members 10 pertaining to Examples 1 to 4, there was no rupture of the plate-shaped rib portions. This suggests that, in the automotive impact absorbing member 10 of structure according to the present invention, providing the thin portion 24 in the widthwise center section of the first plate-shaped rib portion 20 has the effect of consistently ensuring a deformation zone for necking to spread to either side in the width direction; and additionally that providing the gradual change portions 26 to either side of the thin portion 24 in the width direction has the effect of preventing sudden change in cross sectional area in association with tensile deformation so that the first plate-shaped rib portion 20 does not experience rupture. The fact that no rupture occurs demonstrates satisfactory impact absorbing capability based on ductility of the first plate-shaped rib portion 20, as compared to the Comparative Examples.

In the automotive impact absorbing member 10 of Example 4 and the automotive impact absorbing member of Comparative Example 1 which have identical gradual change portion rate of change: r (r=2) as represented by Expression 2, the results for rupture differed depending on whether or not the thin portion 24 was provided in the widthwise center section of the first plate-shaped rib portion 20. This indicates that providing the thin portion 24 in the widthwise center section is an essential element in terms of preventing rupture of the rib portion.

What is claimed is:

1. An automotive impact absorbing member integrally formed of synthetic resin material having lengthwise shape that extends with a constant hollow cross section, the automotive impact absorbing member comprising:
   plate-shaped rib portions each extending in a direction perpendicular to an impact load input direction; and
   load transmitting portions connecting with the rib portions at either widthwise end thereof for transmitting a widthwise direction component force of an impact load to the rib portions,
   wherein at least one of the plate-shaped rib portions has a thin portion of minimum thickness dimension situated in a widthwise center section thereof, and has a pair of gradual change portions situated to either side of the thin portion in a width direction and which increase gradually in thickness dimension outwardly in the width direction, and
   wherein a ratio of a widthwise dimension of the thin portion to a total widthwise dimension of the plate-shaped rib portion is between 0 (exclusive) and 0.8 (inclusive) and a widthwise dimension of the gradual change portions to the total widthwise dimension of the plate-shaped rib portion is between 0.1 (inclusive) and 0.5 (inclusive).

2. The automotive impact absorbing member according to claim 1, wherein the thin portion is formed so as to extend with a constant thickness dimension in the width direction of the plate-shaped rib portion.

3. The automotive impact absorbing member according to claim 1, wherein the thin portion and the gradual change portions connect smoothly with a curved surface shape, in the width direction of the plate-shaped rib portion.

4. The automotive impact absorbing member according to claim 3, wherein the thin portion and the gradual change portions situated to either side thereof in the width direction are formed with surface shapes which are curving surfaces connected in the width direction of the plate-shaped rib portion.

5. The automotive impact absorbing member according to claim 1, wherein a plurality of plate-shaped rib portions are disposed spaced apart from one another in the impact load input direction.

6. The automotive impact absorbing member according to claim 1, wherein the impact absorbing member has a tubular portion having an elongated tubular shape that extends with a substantially unchanging octagonal hollow cross section, and a first plate-shaped rib portion and a second plate-shaped rib portion integrally provided on an inside of the tubular portion, while being spaced apart from each another in the impact load input direction to provide the plate-shaped rib portions, and wherein the tubular portion comprises:
 a first load transmitting portion extending parallel to and being spaced from the first plate-shaped rib portion;
 a pair of second load transmitting portions connecting at first widthwise ends thereof with widthwise sides of the first load transmitting portion while connecting at other widthwise ends thereof with the first plate-shaped rib portion; and
 a pair of third load transmitting portions connecting at first widthwise ends thereof with widthwise outer ends of the second load transmitting portions while connecting at other widthwise ends thereof with the second plate-shaped rib portion, so as to constitute the load transmitting portions to apply the first and second plate-shaped rib portions the widthwise direction component force of the impact load.

7. The automotive impact absorbing member according to claim 1, wherein the plate-shaped rib portion has a pair of thick portions situated to outsides of the pair of gradual change portions, respectively, which increase gradually in thickness dimension outwardly in the width direction.

8. An automotive impact absorbing member integrally formed of synthetic resin material having lengthwise shape that extends with a constant hollow cross section, the automotive impact absorbing member comprising:
 plate-shaped rib portions each extending in a direction perpendicular to an impact load input direction;
 load transmitting portions connecting with the rib portions at either widthwise end thereof for transmitting a widthwise direction component force of an impact load to the rib portions,
 wherein at least one of the plate-shaped rib portions has a thin portion of minimum thickness dimension situated in a widthwise center section thereof, and has a pair of gradual change portions situated to either side of the thin portion in a width direction and which increase gradually in thickness dimension outwardly in the width direction,
 wherein a ratio of a widthwise dimension of the thin portion to a total widthwise dimension of the plate-shaped rib portion is between 0 (exclusive) and 0.8 (inclusive), and
 wherein a rate of change r (t/w) of a thickness dimension (t) relative to a width dimension (w) of the gradual change portions is $0 \leq r \leq 2$ as computed using an expression: $r=(((t_1-t_0)/t_0) \times 100)/w$, where $t_0$ denotes a thickness dimension of the gradual change portion at a widthwise inner end thereof which connects with a widthwise outer end of the thin portion and which represents a minimum thickness dimension of the gradual change portion, and $t_1$ denotes the thickness dimension at the widthwise outer end which represents the maximum thickness dimension of the gradual change portion.

9. An automotive impact absorbing member integrally formed of synthetic resin material having lengthwise shape that extends with a constant hollow cross section, the automotive impact absorbing member comprising:
 plate-shaped rib portions each extending in a direction perpendicular to an impact load input direction; and
 load transmitting portions connecting with the rib portions at either widthwise end thereof for transmitting a widthwise direction component force of an impact load to the rib portions,
 wherein at least one of the plate-shaped rib portions has a thin portion of minimum thickness dimension situated in a widthwise center section thereof, and has a pair of gradual change portions situated to either side of the thin portion in a width direction and which increase gradually in thickness dimension outwardly in the width direction,
 wherein a ratio of a widthwise dimension of the thin portion to a total widthwise dimension of the plate-shaped rib portion is between 0 (exclusive) and 0.8 (inclusive), and
 wherein the ratio of the widthwise dimension of the thin portion to the total widthwise dimension of the plate-shaped rib portion is approximately the same as a ratio of a widthwise dimension of each of the gradual change portions to the total widthwise dimension of the plate-shaped rib portion.

* * * * *